US011900788B1

(12) United States Patent
Zwirn

(10) Patent No.: US 11,900,788 B1
(45) Date of Patent: Feb. 13, 2024

(54) AUTOMATIC PULL STATION PROTECTOR AND METHOD

(71) Applicant: Jeffrey D. Zwirn, Tenafly, NJ (US)

(72) Inventor: Jeffrey D. Zwirn, Tenafly, NJ (US)

(73) Assignee: Zwirn Corporation, Tenafly, NJ (US)

( * ) Notice: Subject to any disclaimer, the term of this patent is extended or adjusted under 35 U.S.C. 154(b) by 0 days.

(21) Appl. No.: 16/352,953

(22) Filed: Mar. 14, 2019

Related U.S. Application Data

(63) Continuation of application No. 16/189,118, filed on Nov. 13, 2018, now abandoned.

(51) Int. Cl.
*G08B 25/00* (2006.01)
*G08B 25/12* (2006.01)
*G08B 29/18* (2006.01)

(52) U.S. Cl.
CPC ........... *G08B 25/008* (2013.01); *G08B 25/12* (2013.01); *G08B 29/18* (2013.01)

(58) Field of Classification Search
CPC ....... G08B 25/008; G08B 25/12; G08B 29/18
See application file for complete search history.

(56) References Cited

U.S. PATENT DOCUMENTS 7,167,094 B2 * 1/2007 Ciarcia, Jr. ........ G08B 13/2417 340/568.1
8,436,727 B2 * 5/2013 Todd ...................... G16H 10/65 340/286.07
9,240,114 B2 1/2016 Showen et al.
9,454,890 B2 9/2016 Lyman et al.
9,830,932 B1 11/2017 Gunderson et al.
9,875,643 B1 1/2018 Sarna, II
9,886,833 B2 2/2018 Noland et al.
9,910,128 B2 3/2018 Griggs et al.
2003/0169177 A1 * 9/2003 Curran ..................... G08B 3/10 340/691.4

(Continued)

OTHER PUBLICATIONS

Webpage printout "The Guardian Indoor Active Shooter Detection System" from "shooterdetectionsystems.com/indoor-detection/"—undated, print date Sep. 17, 2018.

(Continued)

*Primary Examiner* — Quan Zhen Wang
*Assistant Examiner* — Rajsheed O Black-Childress
(74) *Attorney, Agent, or Firm* — Tuggle Duggins P.A.; Blake P. Hurt

(57) ABSTRACT

An electronic control module associated with a fire alarm control panel (FACP) and a wander detection system in communication with security system input detection equipment is disclosed herein. The control module disconnects each of the initiating detection circuits (IDC) in each of the one or more zones of the FACP, preventing manual activation of any of the security system equipment affiliated with the respective IDCs to prevent a wandering patient from otherwise activating and engaging the system. By electronically maintaining at least one leg of the normally open (N.O.) circuit in the open position, in effect utilizing the protective loop of the N.O. circuit in a strategic "open circuit" condition, the module prevents any electronic signal from being sent back to the FACP as is typically the case when a manual pull station is activated.

16 Claims, 6 Drawing Sheets

(56) References Cited

U.S. PATENT DOCUMENTS

| | | | | |
|---|---|---|---|---|
| 2011/0032109 | A1* | 2/2011 | Fox | G08B 25/006 340/628 |
| 2014/0269199 | A1 | 9/2014 | Weldon et al. | |
| 2014/0327543 | A1 | 11/2014 | Showen et al. | |
| 2016/0049053 | A1* | 2/2016 | Simmons | G01C 21/206 340/815.4 |
| 2016/0232774 | A1 | 8/2016 | Noland et al. | |
| 2017/0123038 | A1 | 5/2017 | Griggs et al. | |
| 2017/0228953 | A1* | 8/2017 | Lupovici | G07C 9/00896 |
| 2018/0151008 | A1* | 5/2018 | Dehnert | G07C 9/00309 340/5.61 |

OTHER PUBLICATIONS

Webpage printout from “amberbox.com” showing “AmberBox Gunshot Detection”—undated—print date Oct. 24, 2018.

Internet download from webpage “amberbox.com/amberbox-white-paper” showing AmberBox Gunshot Detection White Paper—undated—downloaded Oct. 24, 2018.

Webpage printout from “shotspotter.com” showing “ShotSpotter” gunshot detection solutions—copyright 2018 ShotSpotter—print date Oct. 24, 2018.

Webpage printout from “senseshot.com” showing “SenseShot” indoor and outdoor gunshot detection systems—copyright 2015-2018 Information System Technologies, Inc.—print date Oct. 24, 2018.

Webpage printout from “protectiveinnovations.com” showing “The Active Shooter Protection System”—undated—print date Oct. 24, 2018.

Internet download from webpage “protectiveinnovations.com” showing “Active Shooter Detection”—undated—downloaded Oct. 24, 2018.

Webpage printout from “shooterdetectionsystems.com” showing “Guardian Gunshot Detection System”—dated Apr. 11, 2018—print date Oct. 24, 2018.

Article from webpage “shooterdetectionsystems.com” about “Guardian Gunshot Detection System”—dated Apr. 11, 2018—print date Oct. 24, 2018.

Webpage printout from “emergency.arlingtonva.us” showing “Active Shooter Awareness & Preparedness: Always Vigilant”—copyright 2018 Arlington County Government—print date Oct. 24, 2018.

Internet download from webpage “wcupa.edu/dps/documents/ActiveShooterFAQs.pdf” showing “Active Shooter FAQ”—undated—downloaded Oct. 24, 2018.

Webpage printout from “accutechsecurity.com/senior-living/resident-guard-senior-living/” showing the “Wander Wearable” band and “Residentguard Wander Management Systems”—print date Jan. 7, 2019.

Webpage printout from “silentpartnertech.com” about “WanderTrack Solution for Wander Prevention and Wander Management”—Copyright 2019 Silent Partner Technologies—print date Jan. 7, 2019.

* cited by examiner

AUTOMATIC PULL STATION PROTECTOR AND METHOD

This is a continuation-in-part of and claims benefits under pending prior application Ser. No. 16/189,118 filed 13 Nov. 2018, entitled: Active Shooter Module and Method, which is incorporated by reference in its entirety herein.

FIELD OF THE INVENTION

The invention herein pertains to commercial fire alarm systems generally, and particularly pertains to an electronic module in communication with a wandering patient management system and a fire alarm system configured to disable its initiating detection components and devices to prevent unauthorized activation of the system.

DESCRIPTION OF THE PRIOR ART AND OBJECTIVES OF THE INVENTION

On Apr. 20, 1999, two teens went on a devastating shooting spree at Columbine High School in Littleton, Colorado, killing thirteen (13) people and wounding more than twenty (20) others before turning their guns on themselves and committing suicide. Since that massacre, the number of catastrophic active shooter events have dramatically increased across the country and have included a spate of fatal shootings in other venues as well, such as in commercial buildings, movie theaters, night clubs, music venues, and more public schools. The ease of access to firearms, and in particular automatic weapons, coupled with the lack of adequate mental health care resources in the United States have led to an epidemic of active shooter tragedies. As recognized by law enforcement and the civilian public, these criminal events most always result in catastrophic and extensive personal injuries and unacceptable death tolls.

Schools in particular create a highly foreseeable danger and kill zone for active shooters, as they contain a large, captive audience of children who have been trained to exit buildings in a predictable manner, thus making these venues an extremely attractive, vulnerable, and soft target to nefarious actors. One such activity engrained in the minds of students and school personnel are predictable egress routes during fire drills, through the time-honored practice of the orderly filing out of all classrooms using a predetermined route to the exterior of the school once the fire alarm in the premises sounds throughout the building. Once the fire alarm system is activated in the school, the population automatically takes the necessary steps to exit outside immediately.

Recently, an active shooter intentionally increased his odds of killing children at a school by intentionally activating a manual fire alarm pull station. Consequently, once the alarms sounded throughout the building, children and teachers in the premises unknowingly walked directly in the path of the active shooter's kill zone, which increased his atrocious treachery. Both addressable and conventional fire alarm control panels are designed to be triggered by a manual pull station, a smoke detector, a heat detector and/or a rate of rise heat detector. Once triggered, all of the audible and visual notification appliances installed throughout the building simultaneously "annunciate." All students and teachers within the school react by proceeding in an orderly fashion outside the school with all possible haste. An active shooter could, as elaborated above, use these same emergency safety plans to consolidate a large number of targets into a confined kill zone area The active shooter thereby greatly increases the number of fatalities potentially inflicted. Authorities having jurisdiction (AHJs) include fire marshals and code officials who require all schools and almost all public venues to have building fire alarm systems. Therefore, the owner of the premises cannot just disregard fire code mandates and/or disconnect these otherwise critically important life safety systems. Likewise, a simple "reset" of the system does not prevent repeat interference with the system.

The current security methodologies which are being used to help protect against active shooter attacks in public schools, churches, synagogues, and other targets, include electronic responses such as auditory and/or visual alarms, access control systems, magnetized or otherwise electronically locked interior and exterior doors, the dispersal of fogging agents, the activation of high intensity strobe lights and in some cases bullet resistant glass, all with the goal of delay, confusion, deterrence, and potential disorientation of the perpetrator in an effort to keep the public, including school personnel and students, safe so that the authorities have the time they need to arrive at the premises and immediately neutralize the threat(s). However, none of these prior art solutions address the opportunity for the active shooter to leverage and manipulate the fire alarm system in the building as a dangerous decoy to get persons in the building to exit immediately, and as a result these occupants unknowingly face the active shooters deadly arsenal and kill zone.

Additionally, or in the alternative, a growing problem in the medical community at large, but particularly in facilities that treat elderly, high-risk patients, is the inadvertent activation of building fire alarm systems or from the system's manual pull stations being engaged by wandering patients. This may happen inadvertently and/or intentionally, for example by dementia patients, or by activating exit buttons, which in either case may unlock the otherwise secured door, permitting the patient to escape from the facility. Current studies suggest that up to 60% of patients with diagnosed Alzheimer's or other types of clinical dementia will wander if given the opportunity to do so, and the average for legal settlements associated with "wander" complaints is over $400,000. Departure via a proximate exit door is the most probable path of egress, but by code all commercial facilities must include exit fire doors (i.e. thresholds equipped with mechanical and electronic features to activate an alarm when opened) throughout the building. The prior art has deployed certain solutions to contain the mobility of these at risk patients (see for example, the ResidentGuard wander management system available commercially by Accutech Healthcare Security Solutions), but a common functionality associated with systems such as these is to automatically and remotely unlock all exit and security doors in the event of a fire alarm system activation. Given the propensity with which a patient population diagnosed with Alzheimer's or other types of clinical dementia will inadvertently (or even intentionally) effectuate a fire alarm condition, for example by activating a manual fire alarm pull station or pressing an exit button that may be located by the exit door, the patient is able to easily circumvent the very system that was designed to protect them.

Thus, in view of the serious disadvantages and limitations associated with prior art devices, the present invention was conceived and one of its objectives is to provide an electronic module capable of deactivating one or all of the manual fire alarm pull stations, smoke detectors, heat detectors, rate of rise heat detectors, exit door security buttons, and/or other detection devices which are associated with sprinkler suppression systems that are typically associated with an addressable or a conventional fire alarm system in the presence of a patient identification device.

It is another objective of the present invention to provide an electronic module which interconnects either wirelessly and/or through hardwiring to a patient identification detection device, so that if a patient identification device is detected the electronic module can then automatically disconnect one or all of the manual fire alarm pull stations, smoke detectors, heat detectors, exit door buttons, and/or rate of rise heat detectors and/or other detection devices such as water flow switches, which are associated with sprinkler suppression systems that are typically associated with an addressable or a conventional fire alarm system.

It is still another objective of the present invention to provide an electronic module configured to interface with a building fire alarm control panel (FACP). When activated the module initiates the FACP to sound in a distinctive audible and/or visual "alarm" condition pattern, which is designed to indicate either through distinctive signaling, voice synthesized messages and/or other messaging methods that a patient has engaged a fire alarm pull station, or is in close proximity to an exit door. Concurrently, emails and text messaging to cellphones may also be initiated to alert persons of the patient's wandering status. Notwithstanding the audible, visual, verbal warnings and electronic messaging set forth above, the electronic module prevents the activation of any of the system's manual fire alarm pull stations, and maintains any nearby security door in the "locked" configuration. In the event the door's default setting is "unlocked", the electronic module can send disengagement signals to the door to prevent the door from being opened.

It is a further objective of the present invention to provide a control module which is configured for electronic communication with each of the normally open (N.O.) circuits and/or Signaling Line Circuits (SLC) and the Remote Alarm Annunciator(s) which are associated with one or more of the given automatic, conventional manual zones and/or addressable zones which are built into or added onto a Fire Alarm Control Panel (FACP) of the addressable or conventional type.

It is still a further objective of the present invention to provide an electronic control module configured to disconnect one or more of the system zones by electronically opening one leg of the N.O. circuit's hardwired loops to electronically prevent the activation of a Fire Alarm Control Panel of the conventional type. For addressable control panel(s) with signaling line circuit loops (SLC), the same interconnection will be made as elaborated to above, but through each of the respective signaling line circuit loops which are built into addressable fire alarm control panels. For mesh network, wireless, and hybrid fire alarm systems the electronic module will function in a similar capacity.

It is yet a further objective of the present invention to provide an electronic control module with one or more remote activation station(s) and/or input(s) that can be connected to other types of systems utilizing hardwired and/or wireless methods including (but not limited to) code hopping spread spectrum technology, universal or other types of wireless transmitters, wireless repeaters, and wireless receivers and/or employing hardwired methodology, whereby an authorized user may manually activate the electronic control module directly or indirectly, or through hardwired inputs of other sensors resulting in the module activating double-throw, double pole set(s) and/or triple throw, triple throw sets of alarm contacts which will change state and be connected to instantly interface with other systems to enhance the active shooter modules security features.

It is another objective of the present invention to provide an electronic control module configured so that the methodology set forth above, or any activation of the electronic control module will trigger a Digital Alarm Communicator Transmitter (DACT) and/or activate a Wireless Radio (Alarm) Transmitter to transmit distinct and identifiable digital alarm codes to central station operators at a 24-Hour, 365 Day UL Listed Central Station who is continuously monitoring the premises in order to alert emergency personnel that a legitimate fire emergency is not in progress. Thereafter, the central station operator(s) will immediately relay this critically important information to first responders such as the fire department or EMS so that they can avoid dispatching important and expensive equipment personnel and leaving these valuable resources to service legitimate emergencies.

Various other objectives and advantages of the present invention will become apparent to those skilled in the art as a more detailed description is set forth below.

SUMMARY OF THE INVENTION

The aforesaid and other objectives are realized by providing an electronic control module associated with fire alarm control panels (FACP) or other security system equipment. Either in response to security system equipment at the premises and/or by authorized personnel activating a panic button of the hardwired and/or wireless type, or through some other device that is designed to lockdown the facility when patient wandering out of a designated area is detected, the control module interfaces and disconnects both addressable and conventional fire alarm systems and other types of security system equipment, including (but not limited to) security doors usually controlled by fire code-approved locking devices.

In the preferred embodiment, the module is configured to connect with one or all of the normally open (N.O.) circuit zones that when initialized by the module no longer function, since the electronic module interfaces with the zone(s) utilizing a series configuration in conjunction is with each of the respective onboard zones of the Fire Alarm Control Panel (FACP). This same methodology is utilized on addressable fire alarm systems by interfacing with the system's field monitored devices, which is how addressable devices communicate with the system's FACP, such as manual fire alarm pull stations, system smoke detectors, heat detectors, rate of rise heat detectors, and sprinkler suppression system waterflow switches. When activated, the module electronically maintains at least one leg of the normally open circuit(s) or signaling line circuit(s) in the open circuit position. In effect providing for control of each of the protective loop zones or points of the normally open circuit(s) or signaling line circuits (SLC) in a strategic "open circuit" condition, so that the manual activation of one or all of the systems manual fire alarm pull stations cannot trigger an addressable or conventional Fire Alarm Control Panel or other types of security system equipment, since the electronic control module inhibits the system from detecting a short circuit condition or alarm data transmitting to the FACP on its signaling line circuits from the field mounted initiating detection devices of the fire alarm systems whether the systems are of the hardwired addressable, conventional or wireless type. The electronic module prevents any electronic signal from being able to transmit data back to the Fire Alarm Control Panel (FACP) to activate the fire alarm system, as is typically the case when a manual fire alarm pull station's system smoke detectors, heat detectors, rate of rise heat detectors and/or if water flow switches are activated. Further, this inhibited condition, of not being able to activate the building fire alarm system and/or other types of security system equipment will be maintained by the electronic control module in the latched/locked-in condition, until such time as the module is deactivated by authorized personnel at a remote station located either in proximity to the Fire Alarm Control Panel, and/or security system's equipment or at a remote location from the Fire Alarm Control Panel, or other security system equipment through secured means requiring a keyswitch(es), wireless keyfob(s), a digital keypad and/or utilizing biometric technology to reset the electronic control module. Additionally, the control module may further be configured for one or more outputs integral with the FACP and/or which are separately connected to the FACP itself, and/or with other security system equipment, to preferably activate a separate set of alarm contacts that will change state, so that the electronic module will be activated and energize its on-board output(s) through wet or dry contacts which may be connected to trigger a Digital Alarm Communicator Transmitter (DACT) and/or to a Wireless Radio (Alarm) Transmitter when the electronic module is activated using the above referenced configuration and/or through a hardwired or wireless methodology to interface to the electronic module. Using the existing outputs of the Fire Alarm Control Panel and/or security system equipment which usually connects to audible and/or visual notification appliances, such as bells, horns, sirens, speakers and strobe lights, the module once activated can also be configured to trigger these outputs to distinctly sound and visually flash differently and/or to provide for a separate display of informational messages and/or unique sounds and/or pattern of sounds and/or lights to mean that it is a "Wander" event, and not a "Fire" alarm event or other type of emergency. A method of operation is also disclosed.

Additionally, or in the alternative, embodiments of the electronic module can be interfaced with fire alarm systems and patient management systems in nursing homes and for other similarly situated occupancies where certain persons, such as dementia patients in these premises frequently and intentionally activate manual fire alarm pull stations. When this happens the fire department is falsely dispatched to the premise. Therefore, and as a result of same these same fire department trucks and personnel cannot be utilized for real emergencies in the communities where they operate. Furthermore, there have been reported incidents where fire trucks racing to the scene of an emergency have accidentally crashed into other vehicles, or vice versa, seriously injuring and/or killing these drivers and first responders. Against the foregoing backdrop, the population of the facilities reacts to the false emergency as if it was a real fire and must take immediate steps to evacuate all of the patients out of the premises. Concurrently, the fire code requires all electronically secured doors at the location to automatically unlock in order to allow for emergency egress whereby these extremely vulnerable dementia and/or otherwise wandering patients within the facility can then exit the premises and be lost, seriously injured or killed. The electronic module connects to proximity-based devices which change state when person(s) wearing bands, tags, or the like, come near the proximity based antennas and/or receivers that can be located near accessible manual fire alarm pull stations and/or exit door security button(s). Therefore, if this high risk group of persons wearing the proximity bracelet or other type of electronic or mechanical tags, also known as electronic article surveillance (EAS) comes near a manual fire alarm pull station(s) or exit door button, the module instantly disconnects the pull station or other switch in the manner described above, so that the respective persons cannot trigger a false alarm as elaborated to above and the electronic module can separately annunciate this condition on-site, both audibly and/or visually and/or the system can notify a 24-Hour-365 Day UL Listed Central Station so that authorized person(s) are notified by a central station operator(s) of the activation of the electronic module. Once activated, the non-functional manual fire alarm pull station(s), exit door button(s), and the electronic module can be reset by a remote station that can be located in proximity to the Fire Alarm Control Panel or by other security system equipment or in a secured location to which only authorized person(s) have access. To reset the electronic module requires the authorized person(s) to utilize a keyswitch, a wireless keyfob, a digital keypad, or biometric technology. The electronic module can also activate a distinctive trouble signal on an addressable, conventional or wireless fire alarm system for system redundancy and/or in notifying authorized persons of the false alarm condition that was intercepted by the electronic module.

DETAILED DESCRIPTION OF THE PREFERRED EMBODIMENT AND OPERATION OF THE INVENTION

Figure 1:
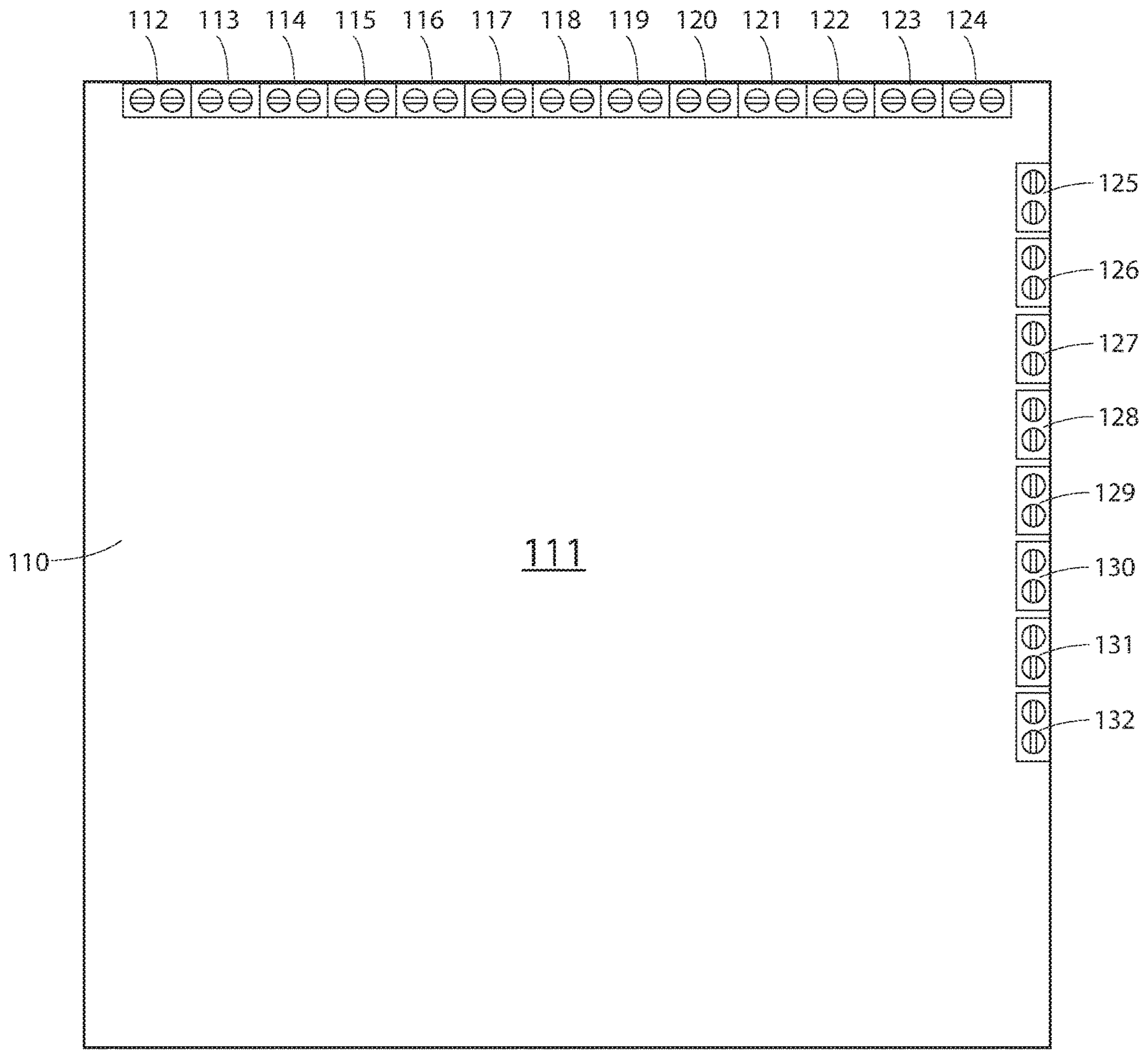
FIG. 1 shows a preferred control module for engagement with a fire alarm system and a wander management system.

The National Fire Protection Association (NFPA) 72 of the National Fire Alarm and Signaling Code® has created consensus based standards for the design, installation, inspection, testing, maintenance and remote station and central station alarm monitoring of all types of fire alarm systems. This includes, but is not limited to both audible and visual notification appliances which shall be installed throughout the building that is being protected by any commercial building fire alarm system. Mass Notification Systems (MNS) can also be installed and utilized as part of a structure's fire alarm system, and not only audibly sound throughout the premises, but may also provide for voice synthesized and/or other messaging. These fire alarm systems typically include pull stations of the manual activation type and system smoke detectors which are designed to automatically detect the presence of smoke or a fire signature. Furthermore, after a manual fire alarm pull station is activated, there is a multitude of other ways to alert users at the site of a fire emergency, as adopted by NFPA 72. In short, the more ways that occupants are alerted that they must evacuate the building due to a fire alarm event (bells, horns, sirens, strobe lights, voice-activated commands, text messaging etc.), the higher the likelihood that the occupants will actually exit the building in a timely manner.

This is all well and good in the case where there is an actual fire. Unfortunately, it is becoming more and more common in instances such as nursing homes and other facilities that care for patients diagnosed with Alzheimer's and other neurodegenerative conditions that wherein the patients either inadvertently or intentionally activate a manual fire alarm pull station. This condition is exacerbated in situations where the facility utilizes what is conventionally known as a "wander management system", defined herein as one or more components that are configured to communication, track, and report data on patients that are intended to be confined within a specific location. In one embodiment, a wander management system may include a wearable data device worn by a patient such as a necklace, anklet, or bracelet that wirelessly communicates with one or more sensors deployed through the facility, any resulting data is transmitted to a centralized control module. These systems are incredibly useful when trying to manage these challenging patient populations, but they universally include a critical flaw: in instances where emergency systems are engaged, these wander management systems, which routinely include functionality for security features, and particularly security doors, become almost entirely disengaged in an effort to effectuate the easy egress away from potential disasters such as fires. Specifically, security doors are rendered unlocked, and in circumstances where the manual fire alarm pull stations are engaged without the presence of a legitimate fire risk, this results in a literal "get out of jail free" card.

Figure 6:
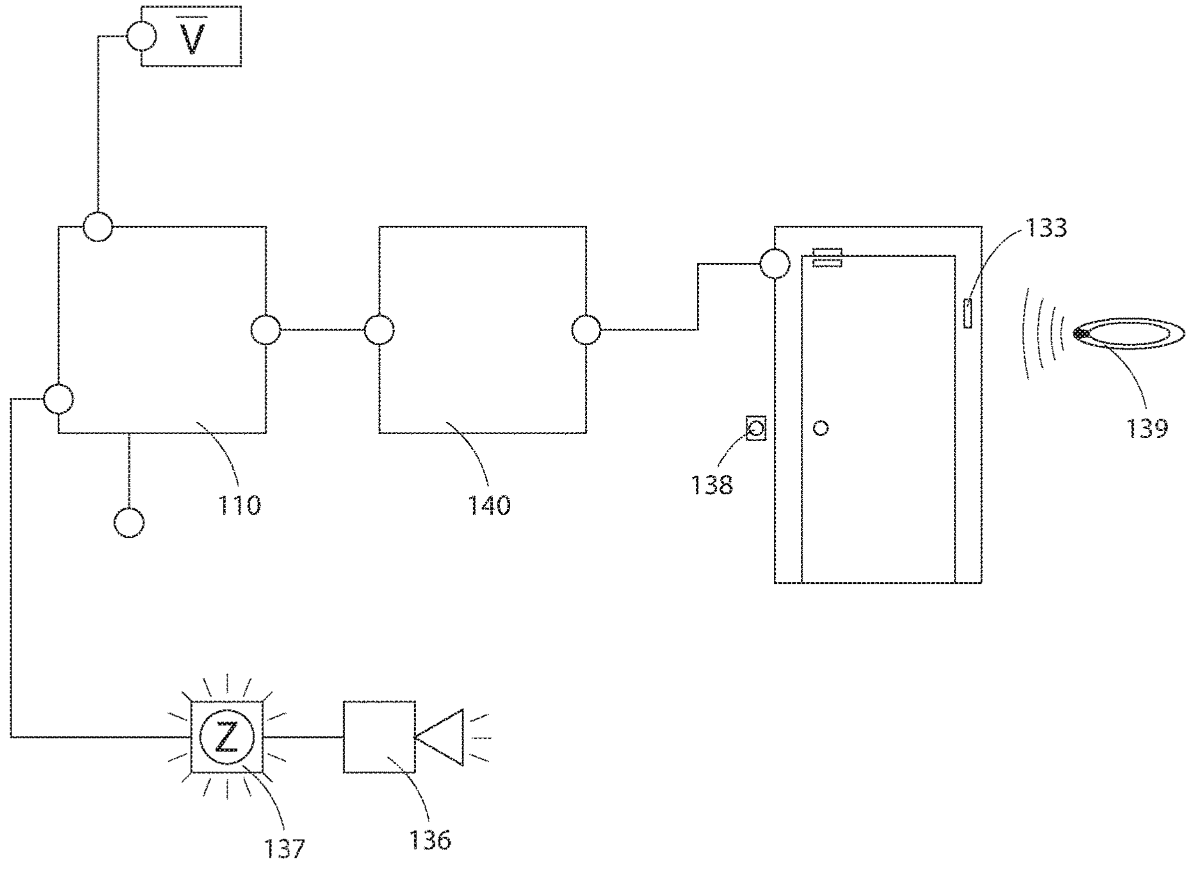
FIG. 6 demonstrates representative functional schematic of the control module.

For a better understanding of the invention and its operation, turning now to the drawings, FIGS. 1-5 illustrate schematic representations of the electronic control module 110 formed from an interface casing 111 and a plurality of zone terminals (112-132, respectively) preferably arranged about the periphery of casing 111, each zone terminal including at least two poles (generally common and normally closed and/or common and normally open). The number of zone terminals is not intended to be a limitation of the instant invention, given that although it is not illustrated, it is intended that the number of terminals contained within a given control module 110 will be commensurate with the specific fire alarm control panel (FACP) with which it is associated, and preferably also interfacing with an associated wander management system 140 (FIG. 6). It should also be appreciated that the interconnection of the control module 110 with the FACP and/or wander management system (not shown) can be of the hardwired type (as contemplated here) or it may engage the FACP with wireless technologies and methodologies, including (but not limited to) Wi-Fi, cellular data, ZWave, encrypted, data pack transmission, mesh network or code-hopping spread spectrum wireless (including the requisite hardware, not demonstrated herein).

In one potential configuration, a first plurality of zone terminals may preferably be associated with one or more input triggers. The prior art is replete with various input triggers such as hardwired and/or wireless smoke detectors, heat detectors, rate of rise heat detectors, carbon monoxide detectors, water flow switches, "panic" buttons and the aforementioned manual fire alarm pull stations to name a few. As would be generally understood in the present context, such one or more input triggers are intended to convey to the FACP in some form or fashion the need for activation of the building fire alarm system and its associated outputs as described in further detail below. However, one preferred input trigger considered beneficial to fire alarm systems with the present invention in view of the increase in patient wandering events is the inclusion of a proximity detector 133 (FIG. 2), and more preferable wireless sensor-type detector is sized, shaped, programmed, and otherwise configured to detect the presence and proximity of a patient identification device on a high-risk patient. It is not the intent of the present disclosure to be limited to a specific type or manufacturer of proximity detector 133, but it is noted that these types of security systems are known in the prior art, see for example the WanderTrack™ system sold commercially by Silent Partner Technologies of Tampa, Florida. Regardless of the technical specification of the one or more proximity detectors 133, it is preferable that at least one zone terminal (112) be associated with a proximity detector 133 and be included in preferred control module 110. A single proximity detector 133 is represented but it should be understood that as many detectors may be in communication with control module 110 as may be desired.

Similarly, a wide variety of security systems are known in the prior art that incorporate a so-called "panic button" 134. Embodiments considered within the instant disclosure include (but are not limited to) one or more physical buttons which are hard-wired and/or of the wireless type and in electronic communication with a FACP and/or security system equipment via control module 110, a radio transmitter or wireless key fob of the type conventionally found associated with key(s), and/or an electronic passcode distributed by a computer, phone, or other mobile computing device. Such a "panic button" would be critical where authorized personnel may witness a patient preparing to wander and engages the system proactively, ideally thwarting the chance at any loss of life or serious personal injury. Like the proximity detector 133, it is preferable that at least one zone terminal (113) be associated with panic button 134 and be included in preferred control module 110. Any additional deployment and configuration of other input devices as described above may further be included in the first plurality of zone terminals to ensure that the fire alarm system functions as desired when detecting and managing fire risks (indicated generally at zone terminal 114). While not demonstrated in the schematic(s), one or more of the zone terminals 112-114 may include embodiments including end-of-line resistor(s) (EOLR) for electronic supervision.

A second plurality of zone terminals may be associated with an interface for control module 110. In an effort to ensure compatibility with a wide range of new and existing fire alarm systems and wander management systems, preferred control module 110 includes interface zone terminals for both addressable and non-addressable (sometimes referred to as "conventional") fire alarm control panels and compatible devices. As would be understood, recent developments in fire alarm system technology have given rise to a phenomenon of addressable devices. Conventional devices were only capable of identifying the location of an alarm event by its affiliation with a given zone in the FACP. For example, a conventional device might display a message at the FACP/Remote Alarm Annunciator during an alarm event such as "Fire Alarm: Zone 2" but "Zone 2" may encompass an entire floor and numerous rooms therein or a multitude of devices. The development of addressable devices permits a much higher degree of specificity by assigning a specific address to each given device and then storing information on the FACP so that each detection device provides the system with pinpoint identification and location of which device(s) triggered the alarm system in an onboard computing device such as a printed circuit board microprocessor (not shown).

Figure 2:
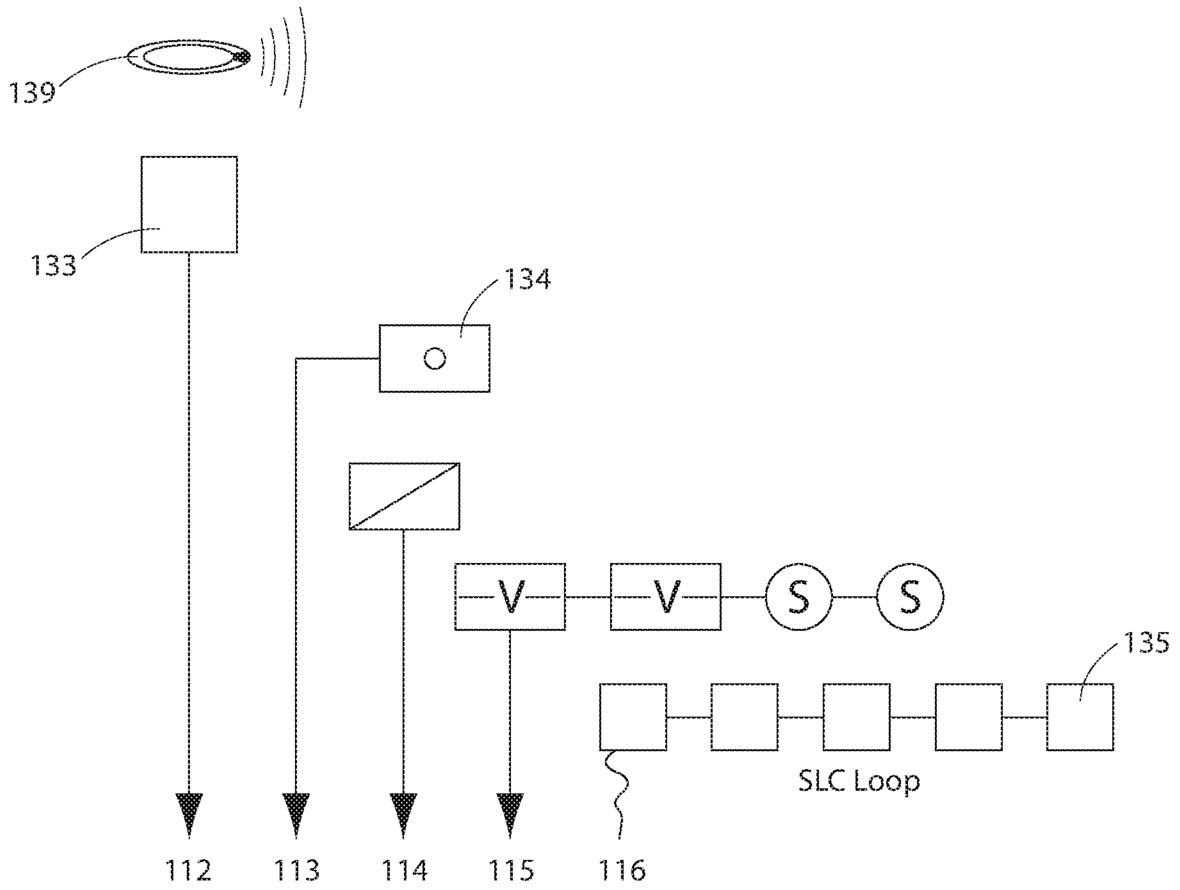
FIG. 2 pictures a detailed overview of certain components of the control module of FIG. 1.
Figure 3:
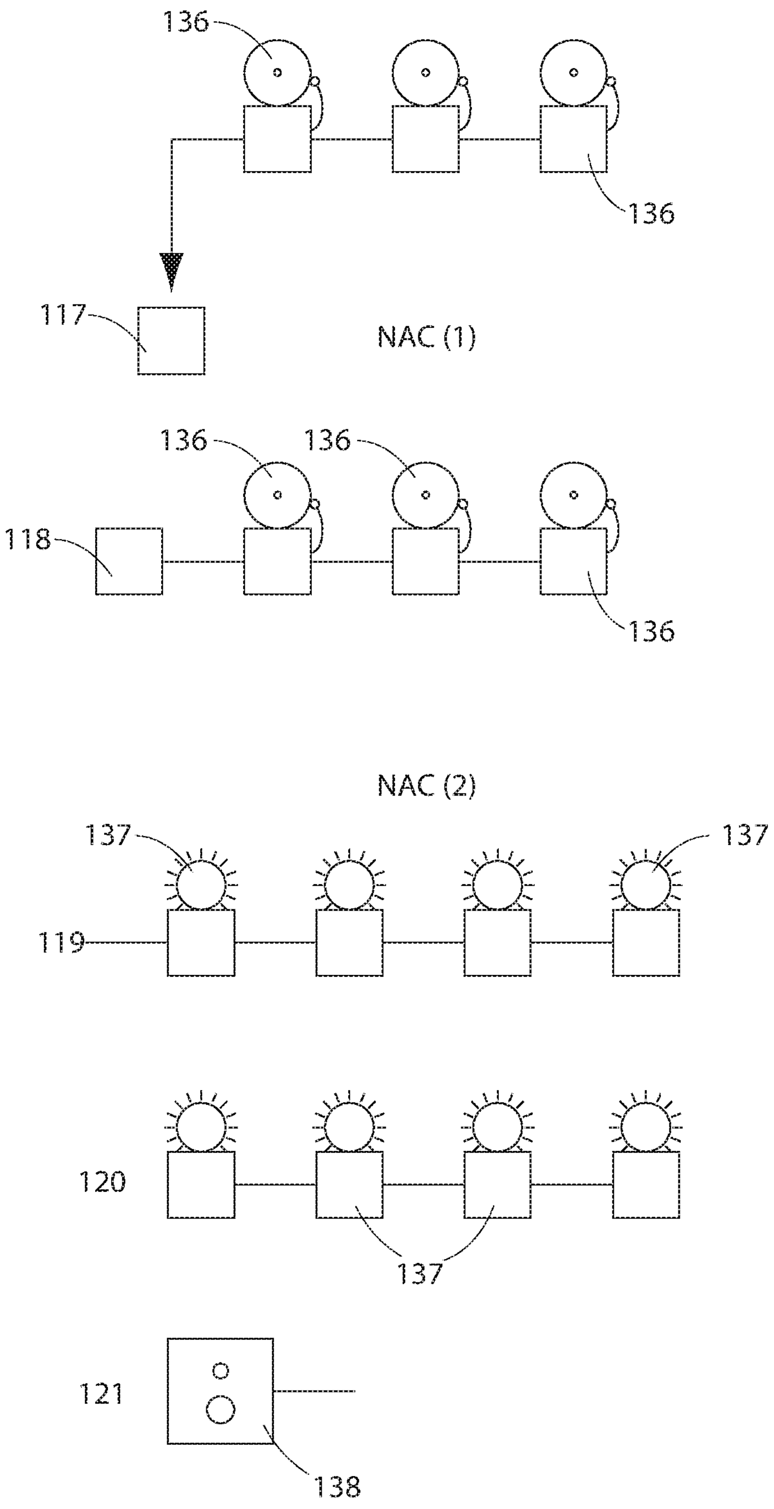
FIG. 3 depicts a detailed overview of additional components of the control module of FIG. 1.
Figure 4:
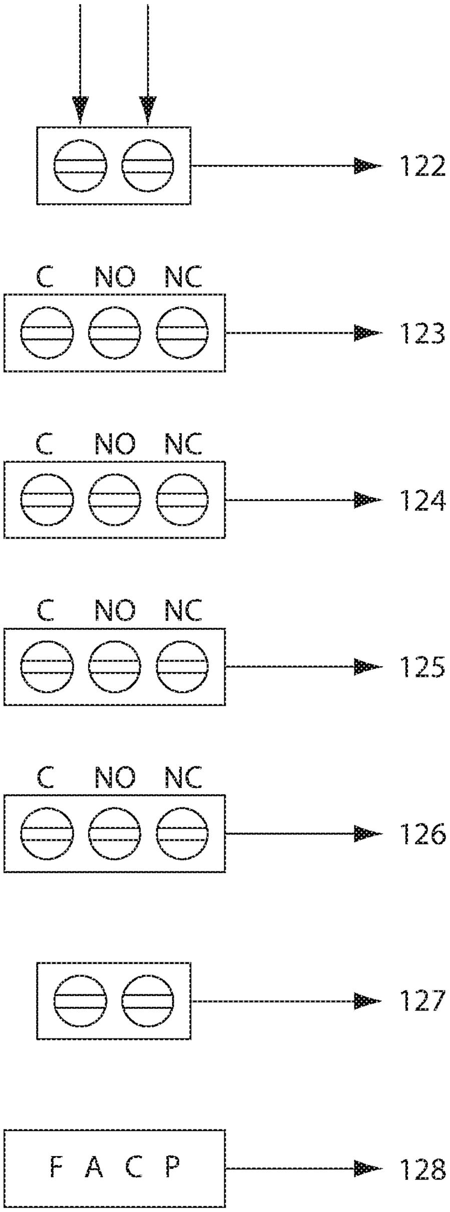
FIG. 4 illustrates a detailed overview of further components of the control module of FIG. 1.
Figure 5:
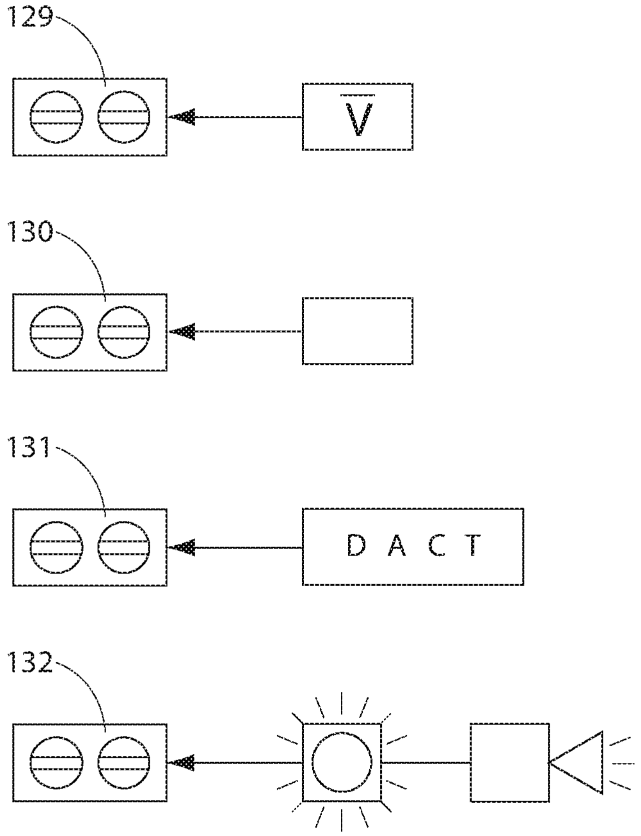
FIG. 5 demonstrates certain other components of the control module of FIG. 1.

To the extent that the building fire alarm system uses an addressable FACP, and/or a "smart" FACP, the control module 110 can be configured to adapt to each of the signaling line circuits (also known as SLC loops (see representative schematic in FIG. 2 indicated as 135). Embodiments of control module 110 may further be configured to adapt to Remote Polling Module (RPM) Technology and/or it can be designed to connect to a "hybrid" FACP, which utilizes conventional, addressable and/or wireless initiating detection devices. However, not all legacy based fire alarm systems have incorporated addressable and/or wireless heads/detecting device technology into them, so it is preferable to assign zone terminals 115 and 116 to interface with compatible conventional and addressable detection devices respectively.

A third plurality of zone terminals 117 and 118 may be associated with one or more audible notification devices, often referred to in the fire alarm and life safety industry as appliance(s). Embodiments of the contemplated audible notification appliances 136 include (but are not limited to) horns, bells, buzzers, sirens, alarms, or speakers (and combinations thereof) as are known in the art. A series of audible notification appliances 136 are displayed in FIG. 3, but it should be understood that their type and number are not intended to be a limitation on the instant disclosure. A fourth plurality of zone terminals 119 and 120 may be associated with one or more visual notification appliances. Embodiments of the contemplated visual notification appliances include (but are not limited to) LED lights, strobe lights, graphical message boards, textual message boards, and combinations thereof as would be understood in the art. A series of visual notification appliances 137 are displayed in FIG. 3, but it should be understood that their type and number are not intended to be a limitation on the instant disclosure.

It may be desirable to include on/off and/or reset buttons that are connected to the control module 110 for manual control of the module, for example by a principal, director, head doctor or nurse, security director or other authorized personnel. The specific embodiment of the switch may take many forms, ranging from a simple momentary normally closed circuit button (to the extent it is in a secured location), a mechanical key switch or a wireless electronic key fob, digital keypad, biometric technology of the hand, eye, or vein pattern recognition, to an electronic signature or password protected login at an associated computer terminal.

Regardless of the structure of the override mechanism, zone terminal 121 is preferably assigned this functionality. It should be understood, the mechanism, along with any corresponding hardware or software necessary to effectuate the override capability (not shown), is not intended as a limitation on this invention. As a schematic representation, a simple button 138 is demonstrated in FIG. 3. Further, it is desirable that control module 110 include its own power supply for logistics and security reasons, among others. In the preferred embodiment, zone terminal 122 serves this role, and it is intended to accommodate any type of reliable, supervised and UL listed power supply whether it come from a conventional power grid, a rectifier or other backup power supply charger equipped with a backup rechargeable battery, an uninterruptable power supply, or an alternative energy power supply. By way of example, and not as a limitation, control module 110 is configured to engage with any 12- or 24-volt security system equipment that operates on either of these DC voltages (not shown).

A fifth plurality of zone terminals 123 and 124 are preferably associated with functionality for emergency outputs. As illustrated more clearly in FIG. 4, these alarm contacts are configured to change state when control module 110 is activated. Upon this change of state, one or more of zone terminals 123 and 124 are intended to be connected to communication channels, for example a Digital Alarm Communicator Transmitter (DACT) and/or a Wireless Radio Alarm Transmitter (RAT) (wireless or wired embodiments are contemplated) so that the control module 110 can disseminate an alert message to a remote monitoring station, using one or more of these communication methods, for example the emergency messages can be programmed to transmit signals to a UL Listed Central Station to inform the authorities of a absence or presence of a legitimate fire emergency, or a facility control office to appropriately manage the wandering patient. In the preferred embodiment, each zone terminal 123 and 124 defines a circuit, using normally open (N.O.), and/or normally closed (N.C.) terminals and/or wet outputs of the (+) and (1) type (see also zone terminals 131 and 132).

A sixth plurality of terminals 125 and 126 may be associated with so-called watchdog circuits (also known as "computer operating properly" or "COP" timers). This type of circuit is preferably an electronic timer that is used to detect and recover from computer malfunctions. During normal operation, the computing device regularly resets the watchdog timer to prevent it from elapsing, or "timing out". If, due to a hardware fault or program error, the computing device fails to reset the watchdog, the timer will elapse and generate a timeout signal. The timeout signal is used to initiate corrective action or actions. The corrective actions typically include placing the computer system in a safe state and restoring normal system operation. Common watchdog circuits are in communication with "status" and "power" circuits as described above. In one embodiment, each zone terminal 125 and 126 defines a circuit, normally open (N.O.), and normally closed (N.C.) terminals for communication with other status systems and/or other security equipment.

A seventh plurality of terminals 127 and 128 serve as communication ports and attachment points for other interfaces. In the preferred embodiment, zone terminal 127 interfaces with a Radio Alarm Transmitter (RAT) (wireless or wired embodiments are contemplated) or a Remote Alarm Annunciator (RAA), conventionally defined as an alphanumeric liquid crystal display keypad used as a central indicator for status of the building alarm system and equipment, including but not limited to alarm, trouble and water flow zones or security systems zones in an installation for occupancies such as a building, school, or industrial plant. Usually, the annunciator panel includes an audible sounder and/or a visual display by way of computerized screens to draw the attention of authorized and/or operating personnel to the alphanumeric liquid crystal display annunciator panel for indication of abnormal events or conditions, and in the case of the present invention, may be used to indicate the presence of an wander event in contrast to the activation of an intentionally activated fire alarm condition or an actual fire detected in the premise by the building fire alarm system. In large buildings, such an annunciator panel is located where it is accessible to first responders such as fire-fighting crews and law enforcement personnel, but may also be positioned in an administrator's office or the like. The annunciator panel will indicate the zone and approximate physical location of the source of an alarm in the building, whether caused by proximity to a security door or in the inadvertent engagement of a pull station. The annunciator will also include audible warning sounders to indicate alarm conditions and failures of alarm circuits, potentially assignable as a "wander" condition(s). In a large building such as hospitals or nursing homes, the alarm annunciator may preferably be associated with a control panel via terminal 128 for building ventilation systems which activate during a fire emergency as well. Additional embodiments may also include functionality associated with an emergency communication system for the building (not shown).

As described above, control module 110 embodies functionality to interface with both fire alarm systems and wander management systems. One or more terminals 129 are configured to communicate with input triggers affiliated with the conventional fire alarm systems, including (but not limited to) manual alarm pull stations. In theory it is intended that control module 110 could be configured to communicate with each and every pull station deployed in a facility, but practically speaking a variety of strategies may dictate that only certain pull stations be in communication with control module 110, for example only those pull stations most proximate to avenues of egress, such as unmanned fire security doors. Regardless of the strategy settled on, control module 110 is the hub by which information from these pull stations is received in the instant system. Similarly, control module 110 includes one or more terminals 130 to interface with a wide variety of wander management systems commercially available or that may become available at a future time. Specifically, this interface receives input from the wander management system regarding the proximity of a patient to an exit door or pull station and communicates this information back to the electronic control module 110 for appropriate preventative measures.

A method of preventing unauthorized departure from a medical facility or the unintentional activation of the building fire alarm system via the manual pull station is also provided. The method includes the steps of providing a control module 110 attached to a FACP and in communication with the informational terminals associated with any and all manual pull stations and engaging the control module 110 during either: a wander event, for example wherein a dementia patient engages a fire alarm pull station in order to release otherwise secure avenues of egress. Activation of the control module 110 may occur via a hardwired or a wireless remote keypad station, wireless key fob, conventional key switch, wireless transmitter, panic button, acoustical detector, electronic article surveillance, or other activation member, either proactively if a reading of an unauthorized patient is received in close proximity to a fire alarm pull station, a security door, or other security equipment (i.e. security cameras or the like). Additionally, or in the alternative, the preferred control module 110 includes programming logic that activates the control module 110 if a proximity detector 133 determines that an unauthorized patient is proximate to a fire alarm pull station or a security door. Once the control module is activated, the building FACP will not go into an "alarm" condition, defined separately, differently, or otherwise apart and distinguishable from addressable or conventional "fire alarm" conditions. In this so-called "wander" alarm condition, no manual activation of any of the pull stations and/or if any of the system smoke detectors, security doors, heat detectors, rate of rise heat detectors or water flow switches that are part of a sprinkler suppression system installed throughout the premises can be falsely triggered in that they will not activate the building fire alarm system until such time that the control module 110 is manually reset at the designated location where the control's module reset control station is located, or alternatively via an adjustable, on-board timer. In the preferred embodiment, this reset station is a hardwire-type reset that cannot be overcome without authorized reset credentials. To the extent that conventional manual fire alarm pull stations are installed on the premises and are configured on multiple zones of the FACP, control module 110 may define multiple on-board zones or expansion zone boards so that each initiating detection circuit (IDC) or (SLC) of the FACP can be connected to the control module(s) 10, respectively.

Specifically, once the FACP enters the aforementioned "wander" alarm condition, the connection between control module 110 and the various normally open (N.O.) circuits of every or certain manual fire alarm pull station zone on the building fire alarm system in series with its onboard contact zones will no longer be able to activate the building fire alarm system. An alternate embodiment may include programmable logic to determine that all of the appliances in proximity to the proximity detector 133 be configured in this manner. This happens when one leg of the normally open circuits hardwired loops automatically and electronically "opens" in a non-transitory manner so that no electrons can flow back to the FACP and trigger a "fire alarm" event, which electronically happens when a manual fire alarm pull station(s) is normally activated after a person in the premises detects a fire condition, by seeing and/or smelling smoke, or opening a security door. In other words, and by design, the protective loops "short circuit" condition cannot initiate audible and visual fire alarm system activation at and throughout the premise since the control module 110 is initiated. Once the control module 110 is activated it can follow the same process and/or it can perform additional functions depending on the needs of the authority having jurisdiction (AHJ). Additionally, or in the alternative, fire responder personnel such as firefighters can be alerted so that valuable firefighting resources are not expended for this false alarm.

FIG. 6 demonstrates a preferred schematic of how the instant system may operate. A user, for example a dementia patient, is shown wearing a patient identification device 139 (represented in an exemplary manner by a bracelet) in communication with proximity detection device 133. When the user approaches an unauthorized exit door, a conventional wander system 140 may receive a notice that the patient is approaching an exit, but otherwise takes no further action and is not in communication with the fire control panel. As such, should the patient engage the manual pull station, the door will be unlocked (mechanical, electromagnetic, etc.) and the patient may depart the facility unsupervised. By comparison, electronic control system 110 preferably serves as the interface with the wander system 140, such that when the patient identification device is detected in close proximity to the proximity detection device, mechanisms including (but not limited to) manual pull stations, the pull station can be deactivated so that were the patient to engage the pull station, no alarm condition results. This prevents disengagement by security doors, maintaining security protocols while also reporting the patient location to a central office, security office, or the like. One or more embodiments may further include a manual request button for authorized exit.

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, the control module can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, is EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

A number of embodiments have been described. Nevertheless, it will be understood that various modifications may be made without departing from the spirit and scope of the disclosure. The illustrations and examples provided herein are for explanatory purposes and are not intended to limit the scope of the appended claims.

I claim:

1. A control module configured for communication with a wander management system and a fire alarm control panel, the control module for preventing patients from activating one or more manual fire alarm pull stations, and in so doing circumventing locks intended to secure said patients by activating one or more aspects of the fire control system that, in turn, are designed to otherwise facilitate egress from a facility housing said patients, the control module comprising:

an interface casing; and a plurality of zone terminals, at least one of the plurality of zone terminals configured for communication with one or more fire alarm pull stations; and wherein the control module, upon detecting a signal emitted from a proximity detection device, deactivates the one or more fire alarm pull stations to prevent patients from activating one or more of the one or more fire alarm pull stations, and in so doing circumventing locks intended to secure said patients by electronically maintaining at least one leg of a normally open circuit(s) or a signaling line circuit(s) in an open circuit position, the proximity detection device defined as an electronic device configured to be worn on a patient so as to communicate a position of said patient relative to at least one of the one or more fire alarm pull stations to the control module, and wherein the proximity detection device communicates to the control module at a time when it approaches at least one of the one or more fire alarm pull stations at a predetermined distance, facilitating an electronic maintaining of at least one leg of the normally open circuit(s) or the signaling line circuit(s) in the open circuit position to prevent the patient from activating the one or more fire alarm pull stations, and in so doing circumventing locks intended to secure said patients, maintaining all external egress doors in a locked configuration and preventing an unnecessary alert signal being passed to a central station that would otherwise dispatch first responder personnel to the facility.

2. The control module of claim 1 wherein the plurality of zone terminals includes at least one end-of-line-resistor.

3. The control module of claim 1 wherein the plurality of zone terminals further comprises a zone terminal configured for communication with a conventional device interface.

4. The control module of claim 1 wherein the plurality of zone terminals further comprises a zone terminal configured for communication with an addressable device interface.

5. The control module of claim 1 wherein the plurality of zone terminals further comprises a plurality of zone terminals configured for communication with one or more audible notification appliances.

6. The control module of claim 5 wherein the one or more audible notification appliances are selected from a group consisting of horns, bells, buzzers, sirens, alarms, speakers, and combinations thereof, wherein a first one or more of the audible notification appliances are activated when a plurality of input triggers detect smoke or a fire, wherein a second one or more of the audible notification appliances are activated when the control module determines that patients are attempting to activate the fire alarm control panel, and wherein the second of the one or more of the audible notification appliances are different and distinct from the first one or more of the audible notification appliances.

7. The control module of claim 1 wherein the plurality of zone terminals further comprises a plurality of zone terminals configured for communication with one or more visual notification appliances.

8. The control module of claim 7 wherein the one or more visual notification appliances are selected from a group consisting of LED lights, strobe lights, graphical message boards, textual message boards, and combinations thereof, wherein a first one or more of the visual notification appliances are activated when a plurality of input triggers detect smoke or a fire, wherein a second one or more of the visual notification appliances are activated when the control module determines that patients are attempting to activate the fire alarm control panel, and wherein the second of the one or more of the visual notification appliances are different and distinct from the first one or more of the visual notification appliances.

9. The control module of claim 1 wherein the plurality of zone terminals further comprises a zone terminal configured for communication with a manual override.

10. The control module of claim 1 wherein the plurality of zone terminals further comprises a zone terminal configured for communication with a power input.

11. The control module of claim 1 wherein the plurality of zone terminals further comprises a plurality of zone terminals configured for communication with one or more emergency outputs.

12. The control module of claim 11 wherein one of the one or more emergency outputs is defined as a digital alarm communicator transmitter.

13. The control module of claim 11 wherein one of the one or more emergency outputs is defined as a radio alarm transmitter.

14. The control module of claim 1 wherein the plurality of zone terminals further comprises a plurality of zone terminals configured for communication with one or more watchdog circuits.

15. The control module of claim 14 wherein the one or more watchdog circuits are defined as a power watchdog circuit.

16. The control module of claim 14 wherein the one or more watchdog circuits are defined as a status watchdog circuit.

* * * * *